United States Patent

[11] 3,585,822

[72] Inventor Joseph C. Worst
 Louisville, Ky.
[21] Appl. No. 8,899
[22] Filed Feb. 5, 1970
[45] Patented June 22, 1971
[73] Assignee General Electric Company

[54] PROPULSION SYSTEM FOR AUTOMATIC WASHER
 4 Claims, 2 Drawing Figs.
[52] U.S. Cl. .................................................. 68/23.7,
 192/104 R, 310/95
[51] Int. Cl. ....................................................... D06f 33/02,
 D06f 37/40, F16d 27/00
[50] Field of Search .......................................... 192/104 R;
 310/95; 68/12, 23.7, 133

[56] References Cited
 UNITED STATES PATENTS
 1,370,749 3/1921 Kimble ......................... 192/104 X

| 3,131,342 | 4/1964 | Wilkerson | 192/104 X |
| 3,463,285 | 8/1969 | Sisler | 192/104 |
| 3,483,719 | 12/1969 | Heidtmann | 68/12 R |

Primary Examiner—William I. Price
Assistant Examiner—Philip R. Coe
Attorneys—James E. Espe, Walter E. Rule, Frank L. Neuhauser, Oscar B. Waddell and Joseph B. Forman ABSTRACT: A tachometer generator is connected to the driven input member of the transmission of an automatic washer. The generator provides a signal to a control circuit which is adapted to vary the current through the coil of an electromagnetic clutch, thus varying the torque transmitted from the clutch input to the clutch output. A drive means having a potential for slippage couples the clutch output to the driven input member of the transmission. Slippage within the drive means is compensated for by the generator delivering to the control circuit a signal which will cause the clutch to increase the torque transmitted to the clutch output.

PATENTED JUN 22 1971

INVENTOR.
JOSEPH C. WORST
BY James E. Espe
HIS ATTORNEY

PROPULSION SYSTEM FOR AUTOMATIC WASHER

BACKGROUND OF THE INVENTION

This invention relates generally to an improved propulsion system adapted to drive the fabric receiving and agitating means of an automatic fabric washing machine at a preselected constant speed.

The use of electromagnetic clutches with automatic washing machine provides an efficient, reliable and low cost means for enabling the user to have a very wide selection of operational speeds to suit various clothes. Reference is made to U.S. Pat. No. 3,463,285 issued Aug. 26, 1969, to R.R. Sisler and assigned to the assignee of the instant invention which teaches and claims one such electromagnetic clutch assembly for use in an automatic fabric washing machine. The Sisler clutch arrangement provides a tachometer generator signal means adapted to provide a signal for the control of the clutch coil, which signal is indicative of the speed of the output member of the clutch. However, when such a clutch is utilized in an automatic washer it is common to connect the clutch output member to the driven washer mechanism through some drive means such as a V-belt which will allow for slippage between the clutch output member and the driven input member. When such slippage occurs between the clutch output member and the driven input member, the torque capability of the electromagnetic clutch as controlled by the tachometer generator signal means is not adjusted to take such slippage into account because the control signal from the tachometer generator signal means is responsive to the speed of rotation of the clutch output member rather than the speed of rotation of the driven input member. For this reason, it is desirable to provide a means for controlling the torque output of such an electromagnetic clutch in response to the rotational speed of the driven input member.

It is therefore an object of my invention to provide a propulsion system for an automatic washing machine including means for varying the torque output of an electromagnetic clutch in response to the rotational speed of the driven input member of the fabric receiving and agitating means, whereby the propulsion system automatically compensates for any slippage which may occur between the clutch output and the driven input member.

It is a further object of my invention to provide such an improved propulsion system including a tachometer generator signal means connected to the driven input member for rotation wherewith to provide a control signal which is indicative of the rotational speed of the driven input member.

SUMMARY OF THE INVENTION

In an automatic fabric washing machine having fabric receiving and agitating means adapted to selectively impart a washing action and a centrifugal extraction action to the fabrics, the receiving and agitating means including an input member, an improved propulsion system is provided to drive the driven input member. The propulsion system comprises a drive motor adapted for connection to a source of electrical energy and an electromagnetic clutch having an input driven by the drive motor at motor speed, an output, and a coil for varying the torque transmitted by the clutch from the input to the output thereof in response to the average current passing through the coil. Drive means are provided for coupling the clutch output and the driven input member, the drive means having a potential for slippage between the output and the driven input member. A current generating means is connected to the driven input member for rotation therewith to provide a control signal which is indicative of the speed of the driven input member. A control circuit is provided for connecting the clutch coil to a source of pulsating electrical energy, the control circuit being adapted to vary the current through the clutch coil in response to the control signal. By this arrangement, slippage occurring within the drive means will be compensated for by the generating means delivering to the control circuit a signal which will cause the clutch to increase the torque transmitted to the output.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings, in which:

DESCRIPTION OF THE PREFERRED EMBODIMENT

Figure 1:
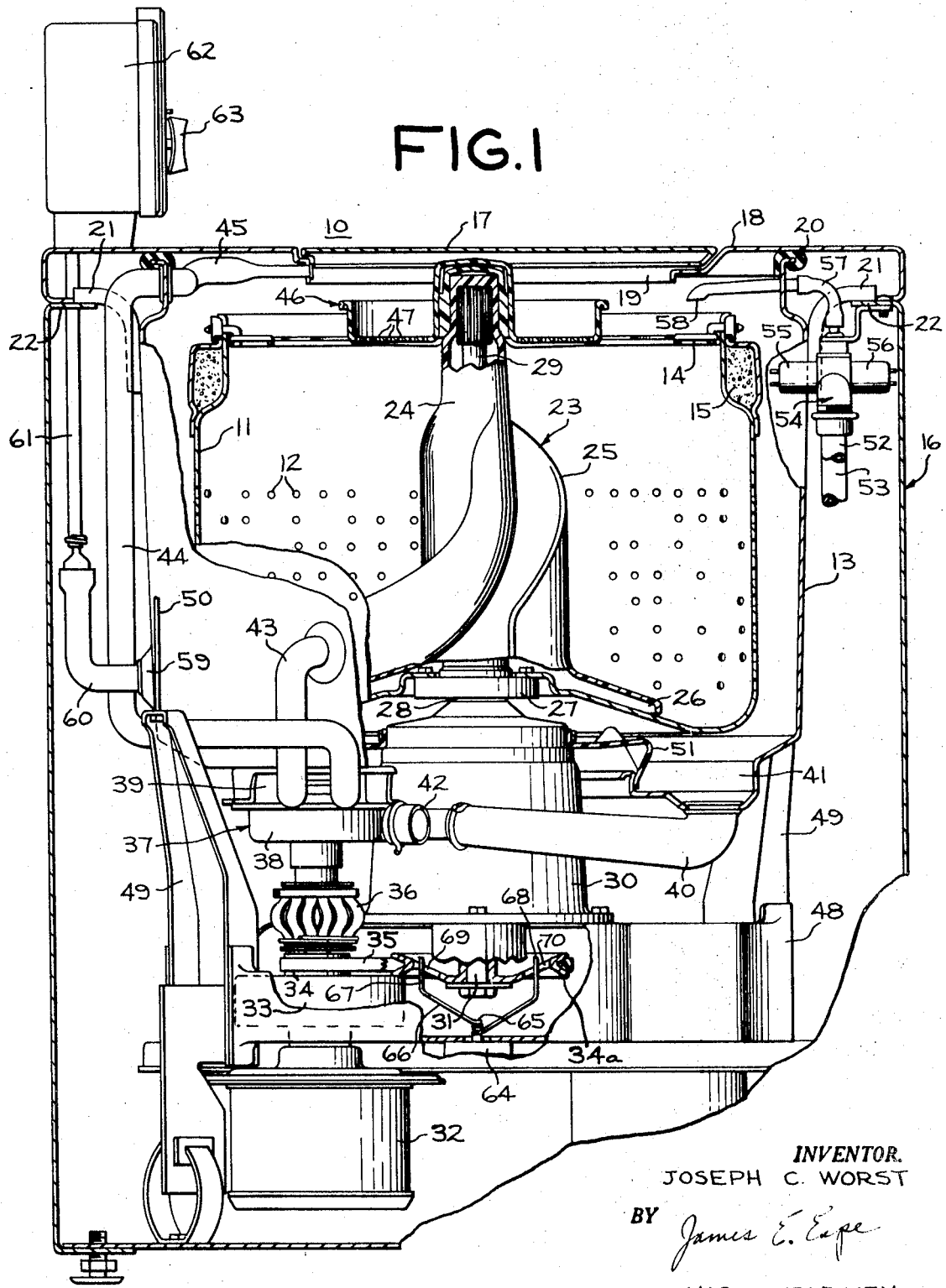
FIG. 1 is a side elevational view of a clothes washing machine incorporating one embodiment of the present invention, the view being partly broken and partially in section to illustrate details.

Referring now to the drawings and initially to FIG. 1 thereof, there is illustrated an agitator type clothes washing machine 10 having a conventional basket or clothes receiving container 11 provided over its side and bottom walls with perforations 12 and disposed within an outer imperforate casing 13 which serves as a liquid receptacle. In combination, the basket 11 and tub 13 together form the receptacle or container means for containing liquid and the fabrics or clothes to be immersed in the liquid. The basket 11 may be provided with a suitable clothes retaining member 14 for preventing clothes from floating over the top of the basket, and with a balance ring 15 to help steady the basket when it is rotated at high speed to extract liquids from the clothes.

Tub 13 is rigidly mounted within an appearance cabinet 16 which includes a cover 17 hingedly mounted on a top portion 18 of the cabinet for providing access through an opening 19 to the basket 11. As shown, a gasket 20 may be provided so as to form a seal between the top of tub 13 and top portion 18 of the cabinet thereby to prevent escape of moisture and moist air into the cabinet around the tub. The rigid mounting of tub 13 within the cabinet 16 may be effected by any suitable means such as strap members 21, each of which is secured at one end to an inturned flange 22 of the cabinet and at its other end to the outside of tub 13. At the center of basket 11 there is provided an agitator 23 including a center post 24 having a plurality of curved water circulating vanes 25 joined at their lower end to form an outwardly flared skirt 26.

Both the clothes basket 11 and agitator 23 are rotatably mounted. The basket is mounted on a flange 27 of a rotatable hub 28 and the agitator 23 is mounted on a shaft 29 which extends upwardly through the hub 28 and through the center post of agitator 23 and is secured to the agitator so as to drive it. During the cycle of operation of the machine 10, water is introduced into tub 13 and basket 11, and the agitator is then oscillated back and forth on its axis within the basket; then, after a predetermined period of this action, basket 11 is rotated at high speed to centrifugally extract the liquid from the clothes and discharge it to drain. Following this extraction operation, a supply of clean liquid is introduced into the basket and the agitator is again oscillated. During this operation, which constitutes the wash step of the cycle, the liquid is preferably mixed with a suitable treating agent such as a detergent in order to effect chemical cleansing of the fabrics. Then the basket is rotated again at high speed to extract the washing liquid. Following this, a supply of clean liquid is introduced into the basket for rinsing the clothes and once again the agitator is oscillated. Finally, the basket is once more rotated at high speed to extract the rinse water. While it is often not done, more than one rinsing operation may be provided if so desired, and various modifications such as spray rinses during a spinning operation may also be provided.

Agitator drive shaft 29 and basket mounting hub 28 are both supported by and driven from a transmission assembly 30. In accordance with my invention, an improved propulsion system is provided to drive the fabric receiving basket 11 and agitator 23 through an input shaft or driven input member 31 of the transmission 30. Included in the propulsion system of my invention is a reversible drive motor 32 and a suitable load limiting electromagnetic clutch 33. In the preferred embodiment, the clutch 33 is mounted directly on the motor drive shaft, and the clutch input is driven at motor speed. As will be explained below in greater detail, clutch 33 has a coil for selectively varying the torque transmitted from the input to the output of the clutch.

A drive means including a first pulley 34 secured to the output of clutch 33, a second pulley 34a secured to driven input shaft 31, and a drive belt 35 extending between the pulleys 34 and 34a, is provided to transmit rotational motion from the clutch 33 to the transmission 30. It will be realized that such a drive means has a potential for slippage between the pulleys 34 and 34a. As will be explained later in greater detail, the propulsion system of my invention is designed to compensate for such slippage and is thereby enabled to drive input member 31 at a preselected constant speed regardless of the occurrence of such slippage.

Depending on the direction of motor rotation, pulley 34a is driven in opposite directions. When the motor is rotated in one direction, the transmission causes agitator 23 to oscillate in a substantially horizontal plane within the basket 11. When the motor 32 is driven in the opposite direction, the transmission rotates basket 11 and agitator 23 together at high speed for centrifugal liquid extraction. While the specific type of transmission does not form part of the invention, reference is made to U.S. Pat. No. 2,844,225 issued July 22, 1958, to James R. Hubbard et al. and assigned to the assignee of the instant invention. That patent discloses in detail the structural characteristics of a transmission suitable for use in the illustrated machine.

In addition to operating the transmission 30 as described, the motor 32 also provides a direct drive through a flexible coupling 36 to a pumping mechanism, generally indicated by the numeral 37, which may include two separate pumps or pumping units 38 and 39 both operated in the same direction simultaneously by motor 32. Pump 38 has an inlet which is connected by a conduit 40 to an opening 41 formed at the lowermost point of the tub 13. Pump 38 also has an outlet 40 which is connected by a conduit 42 to a suitable drain (not shown). Pump 39 has an inlet connected by a conduit 43 to the interior of tub 13 and an outlet connected by a conduit 44 to an inlet nozzle 45 positioned to discharge into a filter pan 46. The pumps are formed so that in the spin direction of motor rotation, pump 38 will draw liquid from opening 41 through conduit 40 and then discharge it through conduit 42 to drain, and in the other or agitation direction of rotation, pump 39 will draw in liquid through conduit 43 and discharge it through conduit 44 and nozzle 45. Each of the pumps is substantially inoperative in the direction of rotation in which it is not used. The particular form of the pump assembly 37 is not significant; rather, assembly 37 is representative of any structure capable of passing liquids selectively out through one outlet or another whether by use of one pump with suitable valving or a combination structure of two pumps. With this structure then, when the motor is rotated so as to provide agitation, pump 39 draws liquid through conduit 43 from tub 13 and discharges it through conduit 44 so that liquid passes from nozzle 45 and falls into filter pan 46, then down through a number of small openings 47 provided in the bottom of the filter pan, and back into basket 11. In this manner, the filter pan 46 with its small openings 47 causes lint which is separated from the clothes during the washing operation to be filtered out of the recirculating water, and thus prevents this lint from being redeposited on the clothes.

Motor 32, clutch 33, transmission 30, basket 11 and agitator 23 form a suspended washing and centrifuging system which is supported by the stationary structure of the machine so as to permit isolation of vibrations from the stationary structure. It will be understood that such vibrations occur primarily as a result of high speed spinning of the basket 11 with a load of clothes therein. While any suitable suspension structure may be used, one such structure includes a bracket member 48 with transmission 34 mounted on the top thereof and motor 32 mounted to the underside thereof. The bracket member 48, in turn, is secured at each end thereof to an upwardly extending rigid member 49, and each of the two upwardly extending members 49 is connected to a cable 50 supported from the top of the machine. While only a portion of the suspension system is shown in FIG. 1, such a vibration oscillation system is fully described and claimed in U.S. Pat. No. 2,987,190 issued June 6, 1961, to John Bochan and assigned to the assignee of the present invention.

In order to accommodate the movement which occurs between basket 11 and tub 13 without any danger of leakage therebetween, the stationary tub 13 is joined to the upper part of transmission 30 by a flexible boot member 51. A member of this type is described and claimed in U.S. Pat. No. 2,959,966 issued Nov. 15, 1960, to John Bochan and assigned to the assignee of the instant invention.

Hot and cold water may be supplied to the machine 10 through conduits 52 and 53 which are adapted for connection, respectively, to sources of hot and cold water (not shown). Conduits 52 and 53 extend into a conventional mixing valve structure 54 having solenoids 55 and 56. Energization of solenoid 55 permits passage of hot water through the valve to a hose 57, and energization of solenoid 56 permits passage of cold water through the valve. Energization of both solenoids permits mixing of both hot and cold water in the valve and passage of warm water into hose 57. The hose 57 has an outlet 58 positioned to discharge into basket 11 so that when one or both of the solenoids 55 and 56 are energized, water passes into basket 11 and tub 13.

The level through which water rises in the basket and tub may be controlled by any suitable liquid level sensing means. One typical arrangement for doing this is to provide an opening 59 in the side of tub 13 adjacent the bottom thereof. The opening 59 is connected through a conduit 60 and a tube 61 to a conventional pressure sensitive switch (not shown), which may be positioned within the backsplash 62 of the machine. As the water rises in the basket 11 and tub 13 it exerts increasing pressure on a column of air trapped in tube 61, and, at a predetermined pressure level, the column of air then trips the pressure sensitive switch to shut off whichever of solenoids 55 and 56 may be energized. The backsplash 62 may contain suitable manual controls, such as that shown at 63, extending therefrom so that a particular fabric cycle including, for instance washing and spin speeds, water temperatures and water level within the tub 13 and basket 11, etc., may be controlled to effect the washing of different types of fabrics.

In accordance with my invention, a suitable tachometer generator 634 is mounted on bracket member 48 of the suspension structure. The tachometer generator is preferably of the AC permanent magnet type and has its armature shaft 65 rigidly connected to a spring wire member 66 intermediate the ends thereof. Upper ends 67 and 68 of spring wire member 66 extend into openings 69 and 70, respectively, of pulley 34a. By this arrangement, tachometer generator 64 is driven at the same speed as is transmission 30, thereby developing an electrical potential or voltage which is representative of the angular velocity of driven input member 31.

Figure 2:
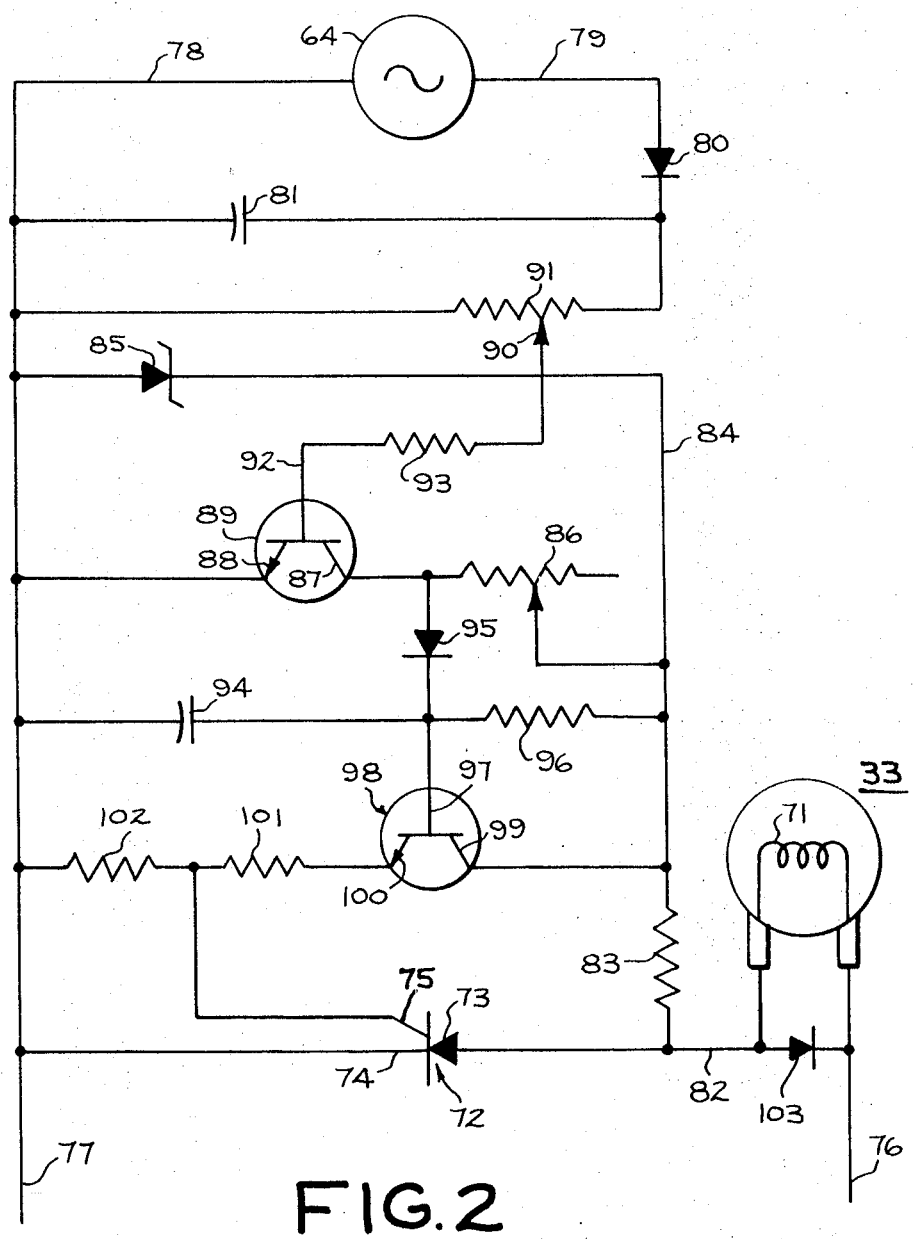
FIG. 2 is a schematic electrical circuit diagram illustrating one embodiment of a control circuit for the machine of FIG. 1.

Reference is made to U.S. Pat. No. 3,483,719 issued Dec. 16, 1969, to D. S. Heidtmann and assigned to the assignee of the instant invention, wherein a control circuit for an electromagnetic clutch such as clutch 33 is disclosed and claimed in detail. Referring to FIG. 2 where such an improved circuit is set out, it will be seen that clutch 33 includes a field coil 71 to vary the torque transmission capability or slippage of the clutch in response to the average current therethrough, as is common in electromagnetic clutches or coupling devices. By varying the current supply to the coil, the speed at which motor 32 will drive the pulley 34 may be controlled.

A controlled rectifier, preferably of the silicone controlled type, is shown at 72 and includes an anode 73, a cathode 74 and a gate 75. A pair of conductors 76 and 77 are provided to connect the coil 71 to a suitable source of pulsating electrical energy (not shown), for instance the usual 110—120 volt AC domestic power. The conductor 76 may be considered the power conductor and the conductor 77 the neutral conductor. One side of the coil 71 is connected to the conductor 76 while the other side is connected to the conductor 77 in series with the anode 73 and the cathode 74 of the controlled rectifier 72.

One terminal 78 of the tachometer generator 64 is connected to the neutral conductor 77 while the other terminal 79 is connected to a rectifier 80 and a filter capacitor 81 to the neutral conductor 77. Thus, a filtered DC voltage, representative of the AC voltage generated by the tachometer 64, will appear across the capacitor 81.

As was previously stated, one side of the coil 71 is connected to the conductor 76 while the other side is connected to a conductor 82 leading to the anode 73 of the controlled rectifier. The conductor 82 is also connected to one side of a dropping resistor 83, the other side of the resistor being connected through a conductor 84 to one side of a Zener diode 85. The other side of the Zener diode is connected to the neutral conductor 77 so that the dropping resistor 83 and the Zener diode 85 function together to provide a stable reference voltage for the control.

As a part of the control, a voltage divider network is provided including a variable resistance 86 and the collector 87 to emitter 88 path of a transistor 89. This voltage divider network is connected between conductor 84 and neutral conductor 77. The intermediate terminal 90 of a variable resistance 91 connected across filter capacitor 81, is connected to the base 92 of transistor 89 through a current limiting resistor 93. Thus, the voltage produced by tachometer generator 64 is used to control the conductivity of transistor 89. This in turn determines the percentage of the reference voltage appearing across the conductor to emitter path of the transistor.

A capacitor 94 is connected across the collector to emitter path of transistor 89 in series with a rectifier 95 and is connected to conductor 84 through a charging resistance 96. The voltage divider formed by resistance 86 and the collector to emitter path of transistor 89, the capacitor 94, the rectifier 95, and resistance 96 form a ramp and pedestal circuit. For each half cycle of applied voltage of proper polarity (with the circuit shown, when conductor 76 is positive with respect to conductor 77) the voltage divider quickly provides the capacitor 94 with a pedestal voltage, the value of which depends upon the conductivity of the transistor 89. The capacitor thereafter is charged to a higher value by a ramp voltage provided through charging resistance 96. The diode 95 isolates the capacitor 94 from the voltage divider once the capacitor voltage reaches the collector to emitter voltage of the transistor. A more detailed explanation of the theory and operation of ramp and pedestal circuit is provided in the General Electric S.C.R. Manual, third edition, Section 8.4.2.

The junction of capacitor 94 and charging resistance 96 is connected to the base 97 of a second transistor 98, having its collector 99 connected to conductor 84 and its emitter 100 connected to neutral conductor 77 through a pair of serially connected resistances 101 and 102. The gate 75 of the controlled rectifier 72 is connected to the juncture of the resistances 101 and 102. It will be recognized that the transistor 98 is connected in the circuit in an emitter-follower configuration. With this connection the transistor 98 will maintain an emitter voltage which is the same as the voltage of capacitor 94, less the nominal half volt drop from the base to the emitter within the transistor. The transistor conducts sufficient collector to emitter current flow to maintain this voltage. When the voltage on capacitor 94 has reached some predetermined level, the collector to emitter current through transistor 98 will be sufficient to cause the controlled rectifier 72 to be gated so as to conduct current through the coil 71.

Assuming, for purposes of describing the operation of the system, as the machine of FIG. 1 is at rest and motor 32 is energized to drive the input member of electromagnetic clutch 33. Initially the output of the clutch will not be turning, and thus no motion will be transmitted through belt 35 to pulley 34a, and thus the tachometer generator 64 will be providing no voltage to the capacitor 81. There will be no input signal to the transistor 89 and the collector to emitter path thereof will exhibit and extremely high resistance. Therefore, during the half cycle when conductor 76 is positive with respect to conductor 77, most of the reference voltage between conductor 84 and conductor 77 will appear across the transistor and this relatively high voltage will be provided as a pedestal voltage to the capacitor 94 through diode 95. The voltage on capacitor 94 is supplied to the base 97 of the transistor 98 and causes a collector to emitter current of flow therethrough. Under normal conditions this current will be sufficient to gate the controlled rectifier 72. Thereafter, for the remainder of that half cycle, the controlled rectifier conducts from its anode to its cathode to provide a current through the clutch coil 71. As is usual in electromagnetic clutches this current through the clutch coil causes the input and output of the clutch to be coupled so that the output begins to rotate.

As the output member of the clutch rotates, causing the machine 10 to be operated, the tachometer 74 generates an ever increasing signal. This causes an increasingly larger voltage to appear across the capacitor 81. A portion of this voltage, determined by the setting of intermediate terminal 90 of the variable resistance 91, causes a current flow into the base 92 of transistor 89 through resistance 93. This means that on succeeding half cycles of proper polarity the collector 87 to emitter 88 portion of the voltage across the voltage divider is smaller and smaller. This results in the pedestal voltage provided to capacitor 94 being lowered so that an increasing ramp voltage must be added to provide a base voltage to transistor 98 sufficient to gate the controlled rectifier 72. In turn, this means that the controlled rectifier is gated increasingly later in each half cycle of proper polarity and less current is provided through the coil 71. Eventually, an equilibrium condition is reached wherein the torque capability of the clutch, provided by the current by the coil 71 is insufficient to cause any faster operation of the washing machine 10.

Since the controlled rectifier 72 will conduct in one direction only, energization of the coil 71 from an AC type pulsating source will cause the clutch always to be deenergized during one-half of each cycle of applied power across the conductors 76 and 77, when operated from an AC source. In order to prevent erratic operation of the clutch, because of this half wave power, a rectifier 103 is connected across the coil 71 to act as a free wheeling diode and allow effective clutch operation from a half wave supply.

The intermediate terminal 90 may be utilized to vary the percentage of voltage across capacitor 81 which is used to apply a current to the base of the transistor 89. Variation of the setting of terminal 90 will vary the platform voltage responsive to a particular speed of the pulley 34a. In practice, this variable resistance 91 conveniently may be used as a customer speed selection control. The resistance 86 is shown as being variable because it is a convenient way for providing factory calibration of the control circuit so as to compensate the circuit for various manufacturing tolerances of both the various elements of the circuit and the machine with which it is associated, so that the control provides the speed desire for each setting of the resistance 91.

This circuit is very stable with regard to the output speed of the clutch and will tend to provide the desired output speed regardless of slight variations in the speed of the machine caused by mechanical resonance of the element of the machine. Also, by using the ramp and pedestal principal, a magnetic clutch control is provided in which the sensitivity may be varied easily. Since the speed with which the capacitor 91 is charged to the proper voltage for firing the controlled rectifier 72 depends upon the slope of the ramp voltage, merely changing the value of the charging resistance 96 will cause the sensitivity of the control to be varied. Therefore controls of various sensitivity may be provided by merely changing the value of this one element.

One suitable control for an automatic washing machine, for instance, can be provided with the following values:

| Reference Numeral: | Value or Type Number |
|---|---|
| 72 | General Electric No. C106B. |
| 80 | 1N5059. |
| 81 | 2 microfarad, 15 v. |
| 83 | 22K ohms. |
| 85 | 1N1771. |
| 86 | 10K ohms, variable. |
| 89 | 2N2926. |
| 91 | 10K ohms, variable. |
| 93 | 10K ohms. |
| 94 | 0.1 microfarad. |
| 95 | 1N5059. |
| 96 | 270K ohms. |
| 98 | 2N2926. |
| 101 | 1K ohm. |
| 102 | 470 ohms. |
| 103 | 1N5059. |

As will now be apparent, the propulsion system of my invention is adapted to drive input member 31 at a preselected constant speed. Should slippage occur in conjunction with belt 35 between pulleys 34 and 34a, such slippage will be compensated for by generator 64 delivering to the aforedescribed control circuit a signal which will cause clutch 33 to increase the torque transmitted to the pulley 34.

As was previously mentioned, my propulsion system is particularly adapted for use in automatic clothes washers wherein it is desirable to vary the torque output of an electromagnetic clutch so as to drive the fabric receiving and agitating means at a preselected constant speed regardless of the occurrence of slippage within the propulsion system. From the foregoing description it should now be apparent that the present invention, by providing a tachometer generator signal means which is connected to the driven input member of the washer transmission, enables the electromagnetic clutch to be controlled so as to compensate for such slippage as may occur between the clutch output and the driven input member of the transmission. Furthermore, by providing a spring-wire connecting means of the type described to connect the generator signal means to the driven input member, a connection is provided which is extremely easy to assemble in the factory and to disassemble for repair in the field.

As will be evident from the foregoing description, certain aspects of the invention are not limited to the particular details of construction of the example illustrated, and it is contemplated that various modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. In an automatic fabric washing machine having fabric receiving and agitating means adapted to selectively impart a washing action and a centrifugal extraction action to the fabrics, the receiving and agitating means including a driven input member; the improvement of a propulsion system adapted to drive the driven input member at a preselected constant speed, comprising:
   a drive motor adapted for connection to a source of electrical energy;
   an electromagnetic clutch having an input driven by said drive motor at motor speed, an output, and a coil for varying the torque transmitted by said clutch from said input to said output to response to the average current passing through said coil;
   drive means coupling said clutch output and said driven input member, said drive means having a potential for slippage between said output and said driven input member;
   current generating means connected to said driven input member for rotation therewith to provide a control signal indicative of the speed of said driven input member; and
   a control circuit for connecting said clutch coil to a source of pulsating electrical energy, said control circuit being adapted to vary the current through said clutch coil in response to said control signal;
   whereby slippage within said drive means will be compensated for by said generating means delivering to said control circuit a signal which will cause said clutch to increase the torque transmitted to said output.

2. The invention of claim 1 wherein:
   said drive means includes a first pulley secured to said clutch output for rotation therewith, a second pulley secured to said driven input member for rotation therewith, and a drive belt extending between each of said pulleys so as to drive said second pulley from said first pulley; and
   said generating means comprises a permanent magnet alternating current generator having an armature shaft and connecting means adapted to connect said armature shaft to said second pulley for rotation therewith.

3. The invention of claim 2 wherein said connecting means comprises a spring wire member rigidly connected intermediate its ends to said armature shaft, said ends being adapted to engage said second pulley for rotation therewith.

4. The invention of claim 3 wherein said second pulley includes first and second openings therethrough, each of said openings being adapted to receive one of said ends of said spring member whereby said spring member is caused to rotate with said second pulley.